(12) United States Patent
Rudnick

(10) Patent No.: US 11,691,807 B1
(45) Date of Patent: Jul. 4, 2023

(54) PACKAGED PLANT DELIVERY SYSTEM WITH STERILE GROWING MEDIUM

(71) Applicant: Nathan Rudnick, San Leandro, CA (US)

(72) Inventor: Nathan Rudnick, San Leandro, CA (US)

(*) Notice: Subject to any disclaimer, the term of this patent is extended or adjusted under 35 U.S.C. 154(b) by 0 days.

(21) Appl. No.: 17/544,118

(22) Filed: Dec. 7, 2021

Related U.S. Application Data

(63) Continuation of application No. 16/792,152, filed on Feb. 14, 2020, now abandoned.

(60) Provisional application No. 62/874,413, filed on Jul. 15, 2019, provisional application No. 62/805,311, filed on Feb. 14, 2019.

(51) Int. Cl.
| | |
|---|---|
| *B65D 85/52* | (2006.01) |
| *B65B 25/02* | (2006.01) |
| *B65D 75/58* | (2006.01) |
| *B65D 81/18* | (2006.01) |
| *A01G 9/02* | (2018.01) |

(52) U.S. Cl.
CPC ........... *B65D 85/52* (2013.01); *A01G 9/02* (2013.01); *B65B 25/02* (2013.01); *B65D 75/5855* (2013.01); *B65D 81/18* (2013.01); *B65D 2251/20* (2013.01)

(58) Field of Classification Search
CPC . A01G 9/02; A01G 9/14; A01G 13/04; A01G 31/02; A01G 31/00; B65B 25/02; B65D 75/58; B65D 75/5855; B65D 81/09; B65D 81/18; B65D 85/52
USPC ...... 47/58.1, 65.7, 65.5, 66.2, 66.7; 206/423
See application file for complete search history.

(56) References Cited

U.S. PATENT DOCUMENTS

| | | | |
|---|---|---|---|
| 3,078,985 A | 2/1963 | Robinson | A65D 75/02 47/84 |
| 3,680,256 A | 8/1972 | Kusumi | A01G 9/029 47/84 |

(Continued)

FOREIGN PATENT DOCUMENTS

| | | |
|---|---|---|
| CN | 101278644 | 10/2008 |
| CN | 101278644 A | 10/2008 |

(Continued)

OTHER PUBLICATIONS

Nine translation (Year: 2018).

*Primary Examiner* — Bryon P Gehman
(74) *Attorney, Agent, or Firm* — Adibi IP Group, PC; Amir V. Adibi; Andrew C. Palmer

(57) ABSTRACT

A sterile packaged plant delivery system includes a container having an opening, an amount of growth medium, a plant, and cover. The amount of growth medium is disposed within an interior of the container and part of the plant is disposed within the growth medium. The cover seals the interior of the container thereby maintaining the plant within a sterile growth environment. In one example, the cover is a thin film seal. A user obtains the system, punctures the film seal, removes the plant from the interior of the container, and plants the plant in a growth environment outside of the container. The system provides a low-cost technique for delivering live plants to end consumers without fungus or bacteria as in typical soil growth and without having to apply costly antimicrobial agent. This eliminates the need for watering and maintenance of any kind while the plant remains in the container.

15 Claims, 9 Drawing Sheets

CROSS-SECTIONAL VIEW OF DOUBLE CONTAINER PLANT STORAGE SYSTEM

(56) References Cited

U.S. PATENT DOCUMENTS

| | | | | |
|---|---|---|---|---|
| 3,748,783 A | 7/1973 | Sokolies | A01G 13/04 475/58.1 R |
| 3,753,314 A | 8/1973 | Clark | A47G 7/006 47/69 |
| 3,961,444 A | 6/1976 | Skaife | B65D 77/04 47/84 |
| 4,106,235 A * | 8/1978 | Smith | A01G 31/02 47/66.2 |
| 4,124,953 A | 11/1978 | Patton | A01G 9/02 47/84 |
| 4,291,493 A | 9/1981 | Monson | A01G 31/02 47/84 |
| 4,299,054 A | 11/1981 | Ware | A01G 31/02 47/84 |
| 4,790,105 A | 12/1988 | Wareing | B65D 85/52 47/84 |
| 2,361,029 A | 9/1989 | Joseph | A01G 6/02 47/69 |
| 5,054,234 A | 10/1991 | Cassells | B65D 85/52 47/69 |
| 5,525,505 A | 6/1996 | Young | A01H 4/001 47/69 |
| 8,397,429 B2 | 3/2013 | Walli | A01G 9/02 47/66.7 |
| 10,356,984 B2 | 7/2019 | Samadpour | A01C 1/02 |
| 2009/0005245 A1 | 1/2009 | Carlson | A01H 4/006 504/100 |
| 2009/0241417 A1 * | 10/2009 | Smith | A01G 9/02 47/65.5 |
| 2013/0269248 A1 | 10/2013 | Kennedy | A01G 9/021 156/249 |
| 2015/0040475 A1 | 2/2015 | Schleeh | A01G 9/029 47/65.5 |
| 2016/0198621 A1 | 7/2016 | Ohlund | A01G 27/02 47/19.1 |
| 2017/0172081 A1 | 6/2017 | Sramek | B65D 65/466 |
| 2020/0369452 A1 | 11/2020 | Persoon | A65D 85/34 |

FOREIGN PATENT DOCUMENTS

| | | | |
|---|---|---|---|
| EP | 0788734 A1 * | 8/1997 | ............ A01G 9/10 |
| ES | 2304312 A1 | 10/2008 | |
| JP | 2018/148831 A | 9/2018 | |

* cited by examiner

CROSS-SECTIONAL VIEW OF PLANT STORAGE SYSTEM

PERSPECTIVE VIEW OF PLANT STORAGE SYSTEM

ACCESSING PLANT STORED WITHIN THE PLANT STORAGE SYSTEM

FORMING A PLANT STORAGE SYSTEM

PERSPECTIVE VIEW OF PLANT STORAGE
SYSTEM WITH TWO CONTAINERS
(ANOTHER EMBODIMENT)

CROSS-SECTIONAL VIEW OF DOUBLE
CONTAINER PLANT STORAGE SYSTEM

STERILE PACKAGED PLANT DELIVERY SYSTEM DISPENSER (ANOTHER EMBODIMENT)

DISPENSING STERILE PACKAGED PLANT DELIVERY
SYSTEMS USING A DISPENSER

PACKAGED PLANT DELIVERY SYSTEM WITH STERILE GROWING MEDIUM

CROSS REFERENCE TO RELATED APPLICATIONS

This application is a continuation of, and claims the benefit under 35 U.S.C. § 120 from, nonprovisional U.S. patent application Ser. No. 16/792,152, entitled "Packaged Plant Delivery System With Sterile Growing Medium," filed on Feb. 14, 2020. U.S. patent application Ser. No. 16/792,152 claims the benefit under 35 U.S.C. § 119 from U.S. Provisional Patent Application No. 62/874,413, entitled "Packaged Plant Delivery System With Sterile Growing Medium," filed on Jul. 15, 2019. U.S. patent application Ser. No. 16/792,152 also claims the benefit under 35 U.S.C. § 119 from U.S. Provisional Patent Application No. 62/805,311, entitled "Packaged Delayed Seed Delivery System With Sterile Growing Medium," filed on Feb. 14, 2019. The subject matter of each of the foregoing documents is expressly incorporated herein by reference.

TECHNICAL FIELD

The described embodiments relate generally to plant storage and delivery.

BACKGROUND INFORMATION

Plants are typically grown by planting seeds in soil. In many conventional environments, plants are susceptible to fungus, bacteria, insects, and other pathogens that are harmful to plant growth. One known mechanism is to apply antimicrobial, antifungal, and/or insecticide agents to plants to mitigate effects of such pathogens. However, these types of agents tend to be costly and can impact plant health. Growing plants from seeds is difficult because more care needs to be given to fragile plants. If water, nutrition, or disease problems occur, the plants' growth can slow, stunt, or even die. As seeds grow, they are much more susceptible to damage; recovery from damage is also not guaranteed, thus a method that avoids this damage is desirable.

A sterile packaged plant delivery system includes a container having an opening, an amount of growth medium, a plant, and a cover. The amount of growth medium is disposed within an interior of the container and part of the plant is disposed within the growth medium. The cover seals the interior of the container thereby maintaining the plant within a sterile growth environment. Unsterilized plants grown in unsterilized soil in high-moisture environments are highly susceptible to fungi and bacterial damage. The novel system provides a low-cost technique for delivering live plants to end consumers without fungus or bacteria as in typical soil growth and without having to apply costly antimicrobial agents. This eliminates the need for watering and maintenance of any kind while the plant remains in the container.

The container and cover are readily available and provide a low-cost technique for manufacturing and providing the novel packaged plant delivery system. Cup sealing machines are commercially available and provide an efficient way of sealing the container with the cover. For example, one type of sealing machine is known and is commonly used to seal boba bubble teas. In one embodiment, the cover of the sterile packaged plant delivery system is a thin film seal. The film seal covers the opening of the container and is then heat sealed using a commercially available heat-sealing apparatus. After a user obtains the system, the user punctures the film seal, removes the plant from the interior of the container, and plants the plant in a growth environment outside of the container.

In another embodiment, a second, inner container is disposed within the container. The inner container is shorter in height as compared to the container. The inner container has at least one opening. The plant extends from growth medium, through the at least one opening, and above a bottom surface of the inner container. This embodiment with two containers results in a more secure and reliable technique of transporting the system without growth medium being undesirably distributed about the system, preventing media from contacting the plant's leaves.

In yet another embodiment, a dispenser is provided that stores a plurality of packaged plant delivery systems. The dispenser is provided in garden supply, nursery, or any other establishment that provides plants. The dispenser stores a variety of plants stored in the novel packaged plant delivery systems. In operation, a user approaches the dispenser and enters a selection into a selection panel of the dispenser. Next, the user is prompted for payment and provides payment through a payment panel of the dispenser. Next, the dispenser supplies a sterile packaged plant delivery system in accordance with the user's selection. Such a dispenser provides a significant competitive advantage to plant suppliers because they need not spend significant resources in maintaining live plants.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
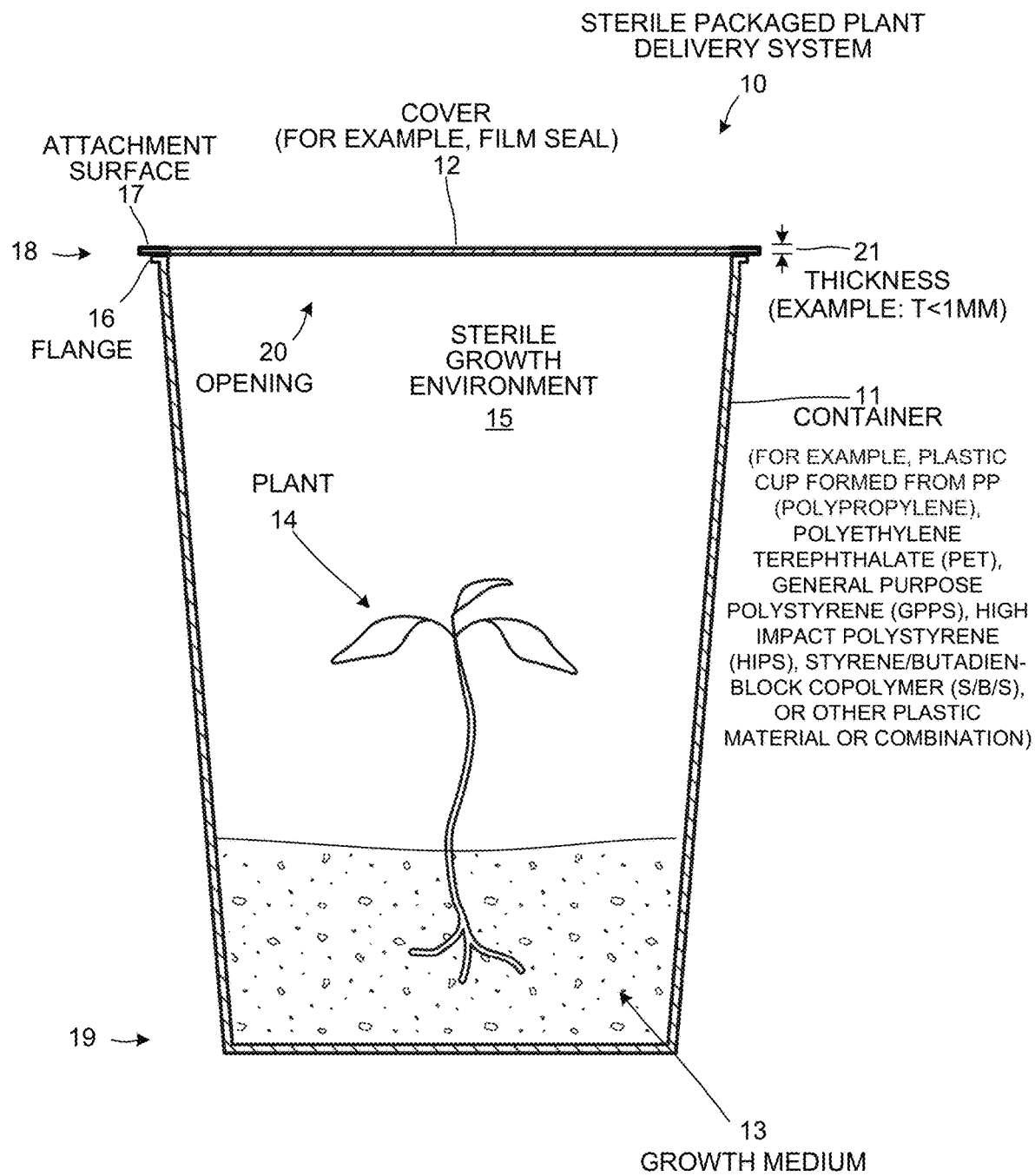
FIG. 1 is a cross-sectional diagram of a sterile packaged plant delivery system 10 in accordance with one embodiment.

FIG. 1 is a cross-sectional diagram of a sterile packaged plant delivery system 10 in accordance with one embodiment. The sterile packaged plant delivery system 10 comprises a container 11, a cover 12, a growth medium 13, and a plant 14. The growth medium 13 is disposed along a lower portion 19 of the container 11. The container 11 has an opening 20 along the top surface 18.

At least part of the plant 14 is disposed within the growth medium 13. The plant 14 absorbs nutrients from the growth medium 13 and is maintained within a sterile growth environment 15. In one example, the growth medium 13 is tissue culture medium, such as M&S (Murashige and Skoog) agar combined with other growth-related nutrients. A sterile plant is placed and sealed inside of the container 11 with the agar and combined growth-related nutrients 13 until ready to replant.

In the embodiment of FIG. 1, The container 11 is a plastic cup having a flange 16. In other embodiments, container 11 has no flange. The flange 16 surrounds the opening 20. The flange 16 extends outwards and away from an interior of the container 11. An upper portion of the flange 16 forms an attachment surface 17 onto which the cover 12 is attached. Container 11 is formed from any suitable plastic material. In one example, container 11 is formed from Polypropylene (PP). In another example, container 11 is formed from Polyethylene Terephthalate (PET). In another example, container 11 is formed from general purpose polystyrene (GPPS). In yet another example, container 11 is formed from High Impact Polystyrene (HIPS). In still another example, container 11 is formed from or Styrene/Butadiene-block copolymer (S/B/S).

The cover 12 seals the top surface 18 of the container 12. This sealing of the opening 20 maintains a sterile growth environment 15 within the interior of the container 11. In one example, the cover 12 is a sealing film, film seal, or thin film plastic seal that entirely covers opening 20 of the container 11. The cover 12 is intended to be opened, either by puncturing or cutting, such that the plant 14 disposed within the growth medium 13 is accessible. The cover 12 has a thickness 21. The cover 12 is provided such that a user will be able to remove or puncture the cover 12 thereby obtaining access to the plant 14. In one specific embodiment, thickness 21 is less than 1 mm in thickness. In another embodiment, the thickness 21 is less than a thickness of the container 11. It is understood that in other embodiments, thickness 21 is greater than 1 mm. Due to this feature, the cover 12 is said to be removable. In one example, the cover 12 is attached to the cover by heat sealing. In another example, the cover 12 is attached to the container 11 through adhesive sealing techniques involving glue, silicon, or any other suitable material adapted to attach the cover 12 to the container 11.

In accordance with one novel aspect, the container 11 and cover 12 are readily available and provide a low-cost technique for manufacturing and providing sterile packaged plant delivery system 10. Cup sealing machines are commercially available and provide an efficient way of sealing container 11 with cover 12. For example, one type of sealing machine is known and is commonly used to seal boba bubble teas.

Figure 2:
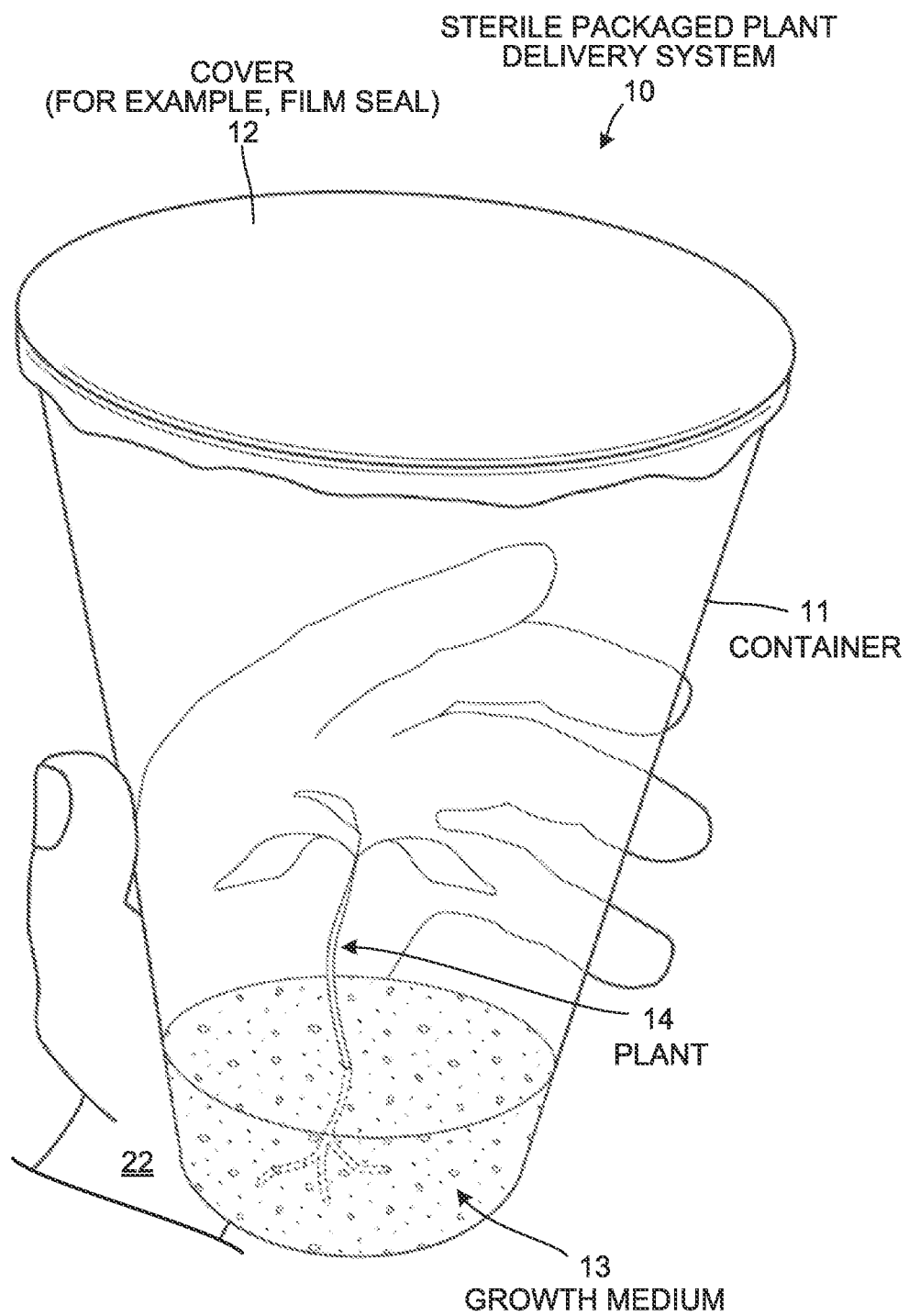
FIG. 2 is a diagram showing a perspective view of the sterile packaged plant delivery system 10.

FIG. 2 is a diagram showing a perspective view of the sterile packaged plant delivery system 10. After a user 22 obtains the sterile packaged plant delivery system 10, the user 22 opens the cover 12, accesses the live plant 14 in the growth medium 13, and plants the plant 14. In other embodiments, the sterile packaged plant delivery system 10 comprises more than one plant disposed within the growth medium 13.

Figure 3:
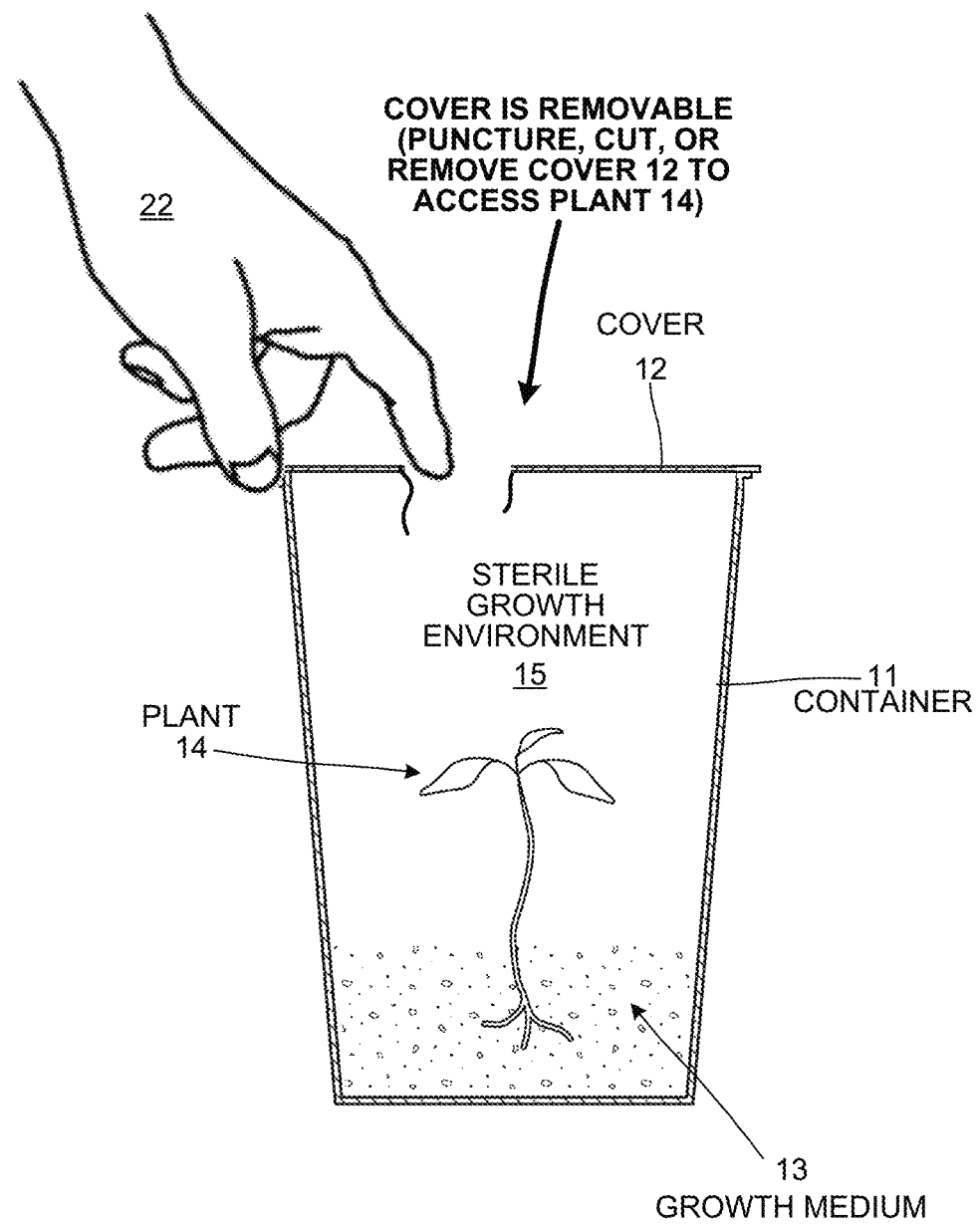
FIG. 3 is a cross-sectional diagram of the user 22 opening the cover 12 of the sterile packaged plant delivery system 10.

FIG. 3 is a cross-sectional diagram of the user 22 opening the cover 12 of the sterile packaged plant delivery system 10. The cover 12 is opened by puncturing or cutting part of the cover 12. After opening, the plant 14 is accessed by the user 22 and planted in an environment outside of the container 11.

Figure 4:
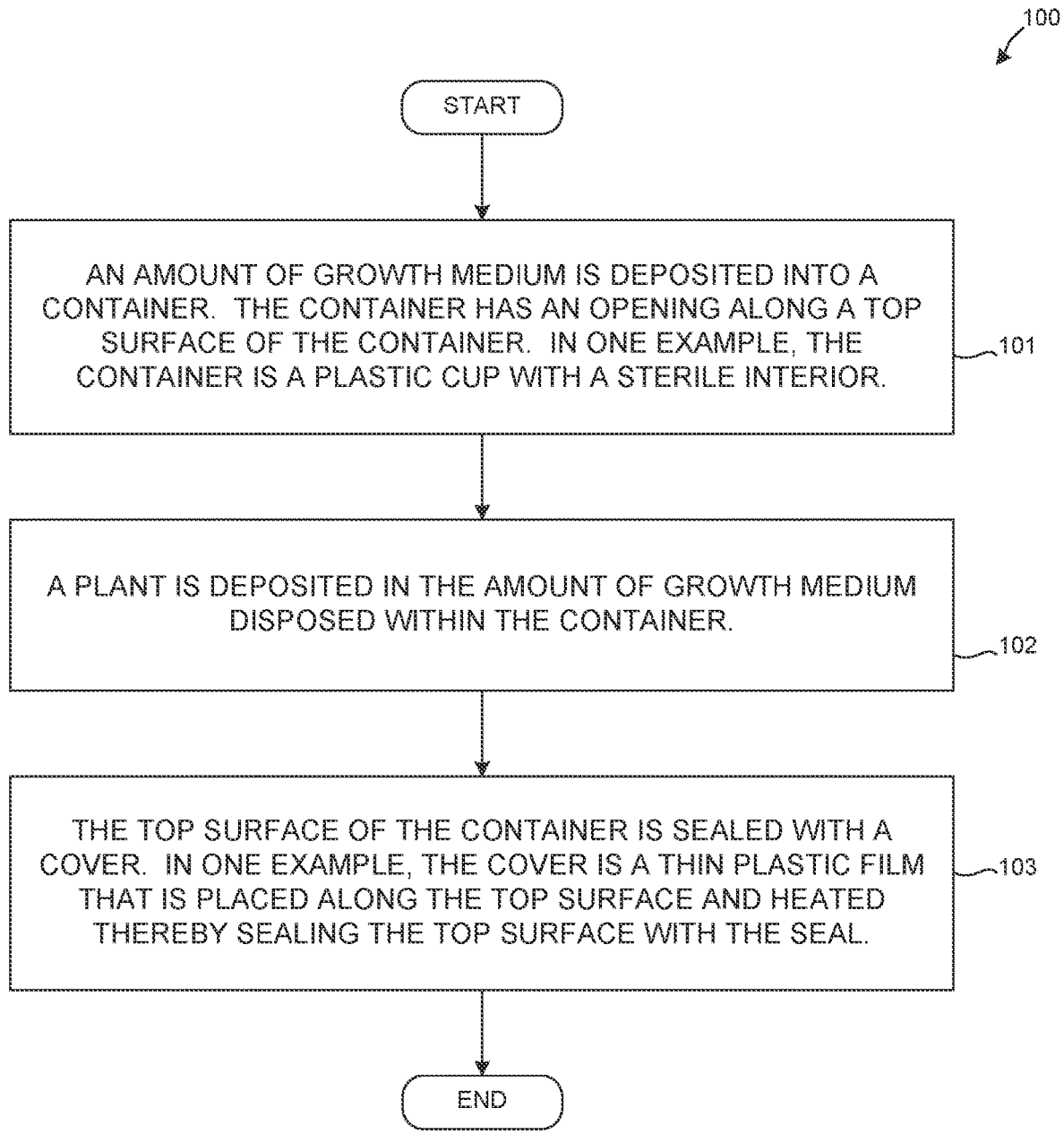
FIG. 4 is a flowchart 100 in accordance with one novel aspect.

FIG. 4 is a flowchart 100 in accordance with one novel aspect. In a first step (step 101), an amount of growth medium is deposited into a container. The container has an opening along a top surface of the container. In one example, the container is a plastic cup with a sterile interior.

In a second step (step 102), a plant is deposited in the amount of growth medium disposed within the container.

In a third step (step 103), the top surface of the container is sealed with a cover. In one example, the cover is a thin plastic film that is placed along the top surface and heated thereby sealing the top surface with the seal.

Figure 5:
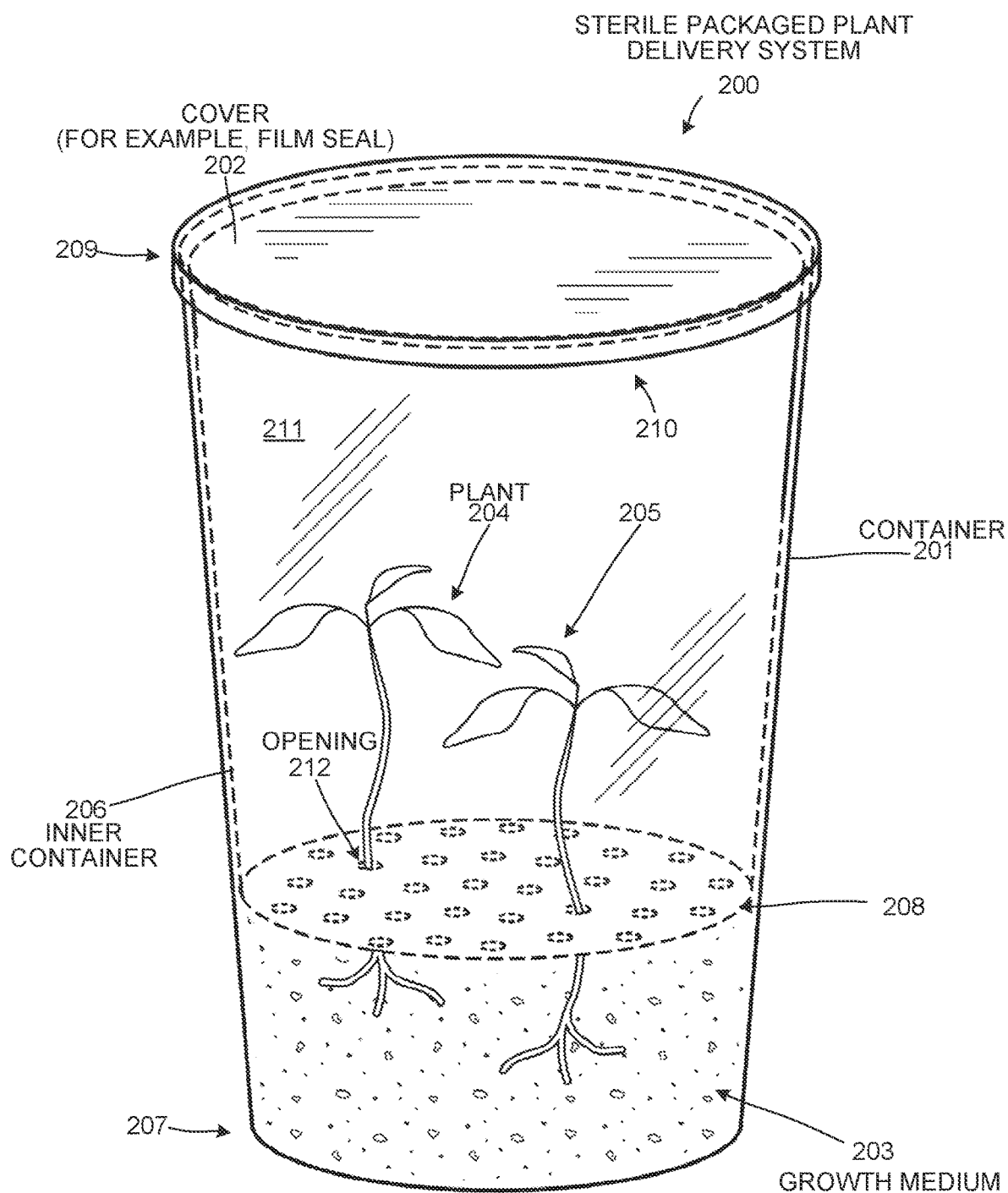
FIG. 5 is a diagram showing a perspective view of a sterile packaged plant delivery system 200 in accordance with another embodiment.

FIG. 5 is a diagram showing a perspective view of a sterile packaged plant delivery system 200 in accordance with another embodiment. The sterile packaged plant delivery system 200 comprises a container 201, a cover 202, growth medium 203, plants 204 and 205, and an inner container 206. The growth medium 203 is disposed along a bottom surface 207 of the container 201. In the embodiment of FIG. 5, two plants 204 and 205 are shown; however, it is understood that the sterile packaged plant delivery system 200 may include only one plant or more than two plants.

The inner container 206 is disposed within the container 201. A bottom surface 208 of the inner container 206 is disposed above the growth medium 203. The inner container 206 includes at least one opening along the bottom surface 208 of the inner container 206. One such opening is identified by reference numeral 212. The inner container 206 has a height that is less than a height of the container 201. In this embodiment, the inner container 206 has more openings than plants. In other embodiments, inner container 206 has one and only one opening per plant.

The cover 202 seals a top surface 209 of the container 201. This sealing of opening 210 maintains a sterile growth environment 211. In one example, the cover is a sealing film, film seal, or thin film plastic seal that entirely covers opening 210 of the container 201. The cover 202 is intended to be opened, either by puncturing or cutting, such that the plants 204 and 205 disposed within the growth medium 203 are accessible. The cover 202 has a thickness that is less than 1 mm so that a user will be able to puncture the cover 202 with minimal effort. Due to this feature, the cover 202 is said to be removable. In one example, the cover 202 is attached to the opening 210 by heat sealing as in the embodiment of FIG. 1.

In accordance with one novel aspect, the inner container 206 maintains and stabilizes the plants 204 and 205 during transport. Each plant extends through an opening of the inner container 206. At least part of each of plants 204 and 205 is below the bottom surface 208 and within the growth medium 203. At least part of each of plants 204 and 205 is above the bottom surface 208. During transport, storage, and delivery, the inner container 206 ensures that the growth medium remains in place and is not scattered or dispersed about container 201. This ensures that plant growth is maintained until a consumer obtains the sterile packaged plant delivery system 200, removes the plants 204 and 205, and plants the plants 204 and 205 in an environment outside of the container 201.

Before delivery, the plants 204 and 205 absorb nutrients from the growth medium 203 and are maintained within sterile growth environment 211. In one example, the growth medium 203 is tissue culture medium, such as M&S (Murashige and Skoog) agar combined with other growth-related nutrients. In another example, the growth medium 203 is sterile soil. Container 201 is formed from any suitable plastic material that provides for low cost manufacture and sealing. In one example, container 201 is formed from Polypropylene (PP). In another example, container 201 is formed from Polyethylene Terephthalate (PET). In another example, container 201 is formed from general purpose polystyrene (GPPS). In yet another example, container 201 is formed from High Impact Polystyrene (HIPS). In still another example, container 201 is formed from or Styrene/Butadiene-block copolymer (S/B/S).

It is understood that the container 201 is not limited to merely the plastic materials set forth above. Other embodiments may employ other combinations of plastic materials. In these other embodiments, such plastic combinations are selected based on gas exchange benefits that promote plant growth. For example, plastic mixtures involving CPP and PET are commonly used due to their desirable gas exchange features.

Figure 6:
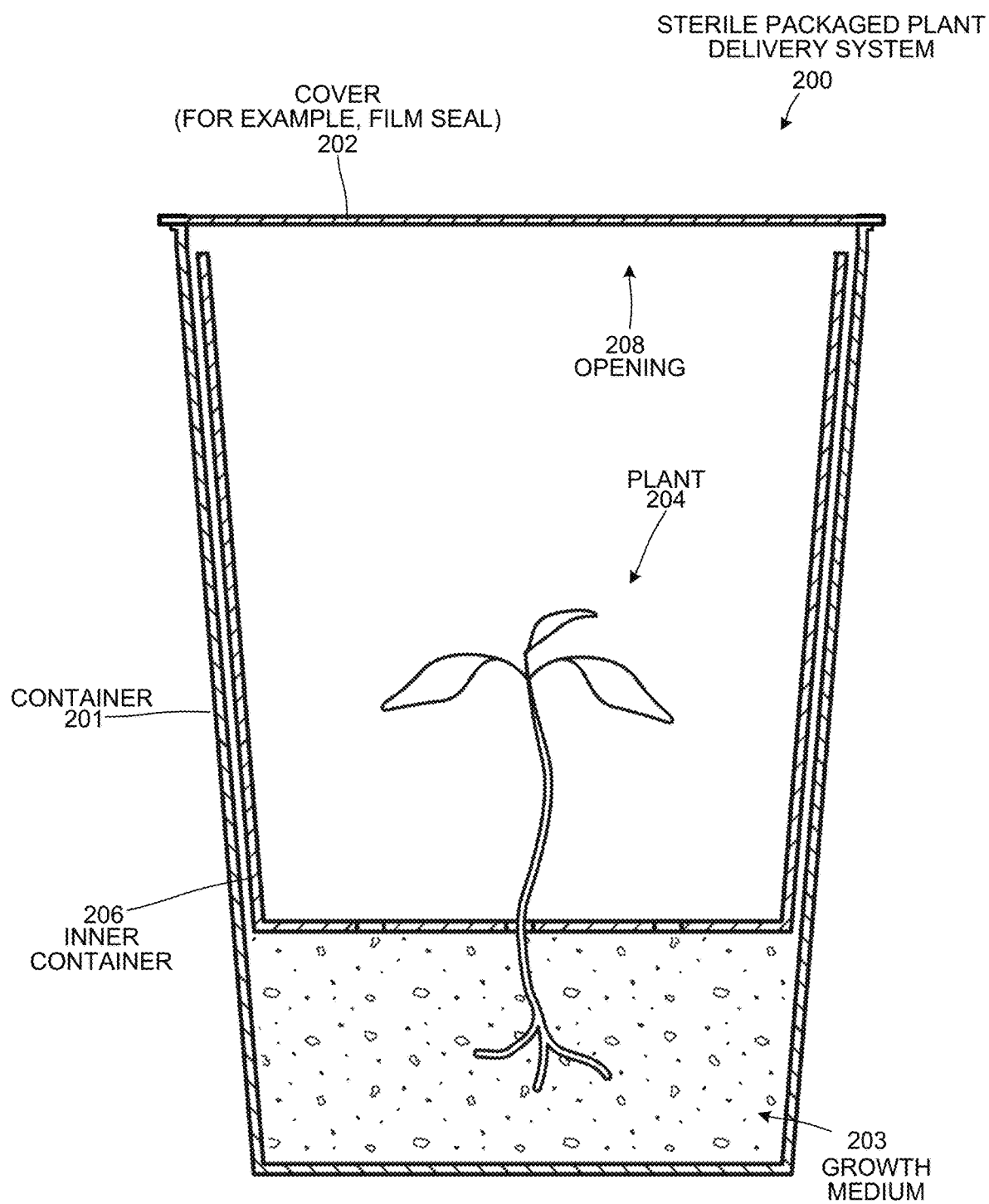
FIG. 6 is a cross-sectional diagram of the sterile packaged plant delivery system 200.

FIG. 6 is a cross-sectional diagram of the sterile packaged plant delivery system 200.

Figure 7:
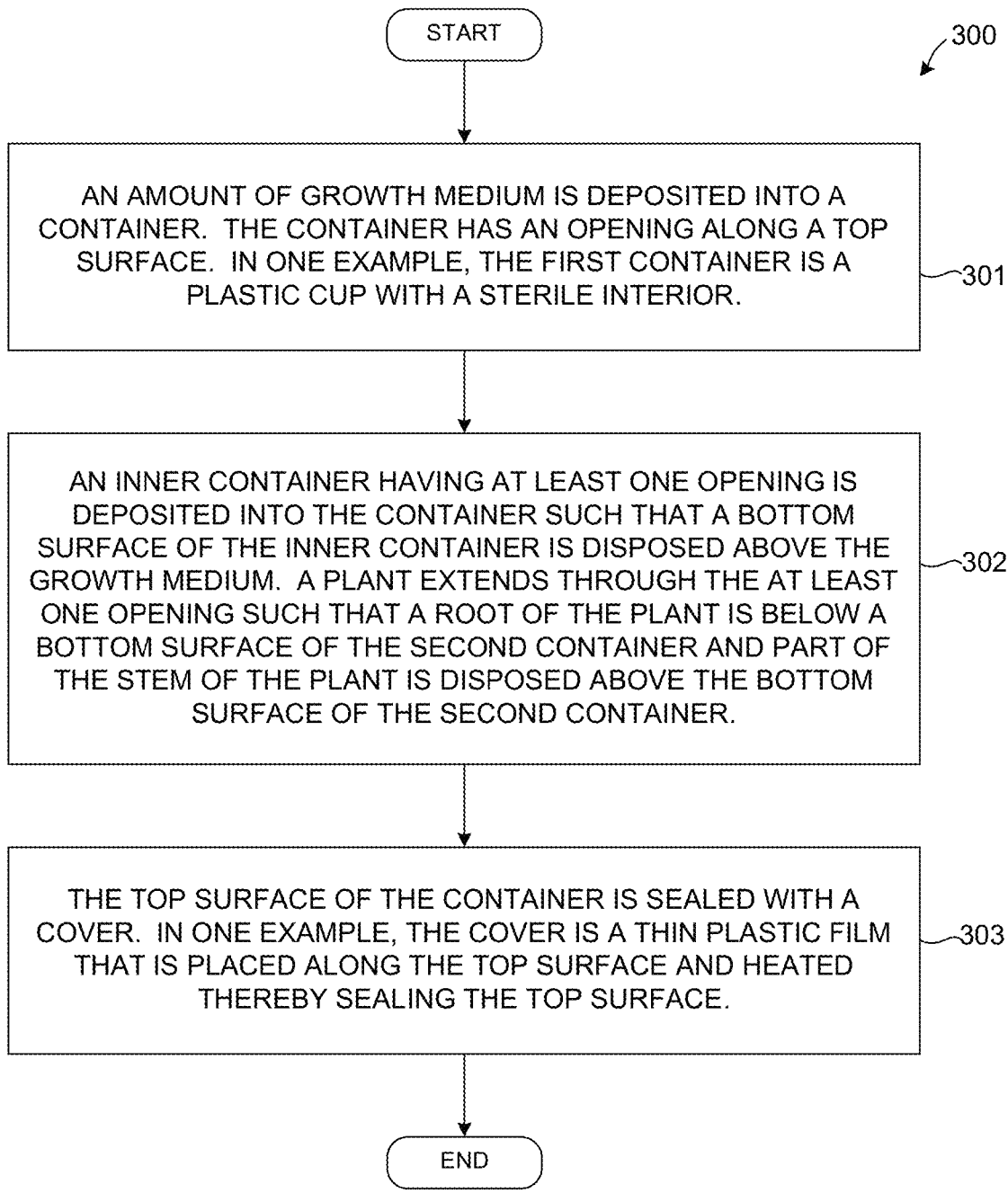
FIG. 7 is a flowchart 300 in accordance with one novel aspect.

FIG. 7 is a flowchart 300 in accordance with one novel aspect. In a first step (step 301), an amount of growth medium is deposited into a container. The container has an opening along a top surface. In one example, the first container is a plastic cup with a sterile interior.

In a second step (step 302), an inner container having at least one opening is deposited into the container such that a bottom surface of the inner container is disposed above the growth medium. A plant extends through the at least one opening such that a root of the plant is below a bottom surface of the second container and part of the stem of the plant is disposed above the bottom surface of the second container.

In a third step (step 303), the top surface of the container is sealed with a cover. In one example, the cover is a thin plastic film that is placed along the top surface and heated thereby sealing the top surface.

Figure 8:
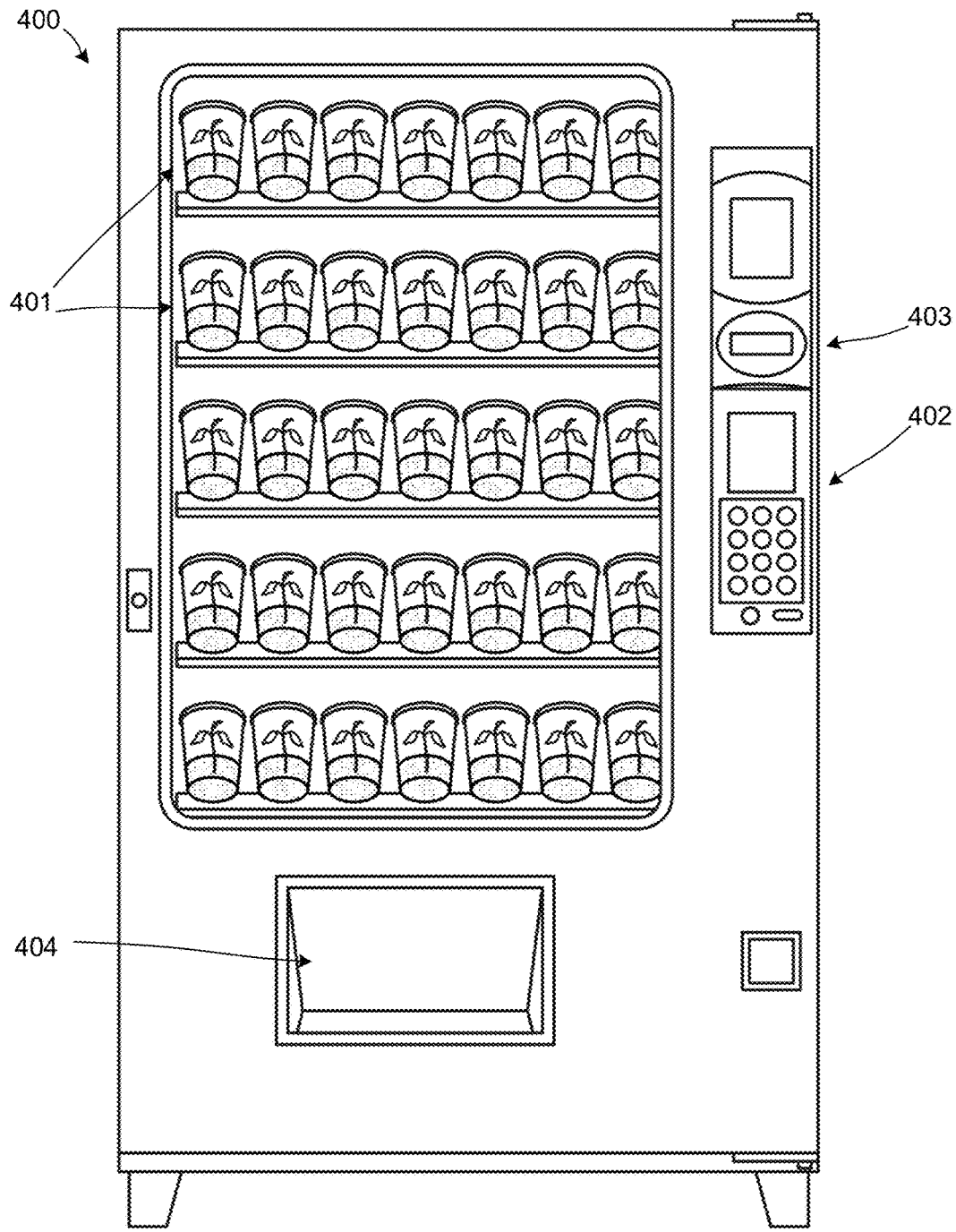
FIG. 8 is a diagram of a sterile packaged plant delivery system dispenser 400.

FIG. 8 is a diagram of a sterile packaged plant delivery system dispenser 400. The dispenser 400 stores a plurality of packaged plant delivery systems 401. The dispenser is provided in garden supply, nursery, or any other establishment that provides plants. The dispenser 400 stores a variety of plants stored in the packaged plant delivery systems 401. A user enters a selection into selection panel 402. Next, the user is prompted for payment and provides payment through panel 403. Next, dispenser 400 supplies a sterile packaged plant delivery system in accordance with the user's selection through opening 404.

Figure 9:
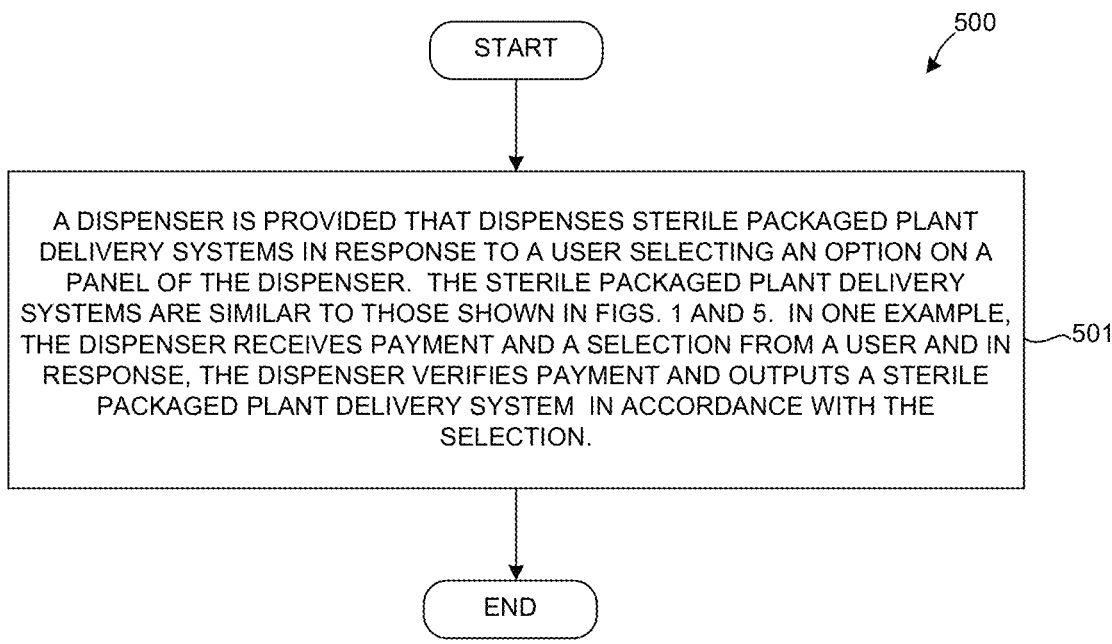
FIG. 9 is a flowchart 500 in accordance with one novel aspect.

FIG. 9 is a flowchart 500 in accordance with one novel aspect. In a first step (step 501), a dispenser is provided that dispenses packaged plant delivery systems in response to a user selecting an option on a panel of the dispenser. The packaged plant delivery systems are similar to those shown in FIG. 1 and FIG. 5. In one example, the dispenser receives payment and a selection from a user and in response, the dispenser verifies payment and outputs a sterile packaged plant delivery system in accordance with the selection.

Although certain specific exemplary embodiments are described above in order to illustrate the invention, the invention is not limited to the specific embodiments. For example, in other embodiments, a pressure stabilizing mechanism is included that pressurizes or depressurizes the system depending on various elevations the novel system is exposed to.

In other embodiments, dry ice, for example, solid $CO_2$, can be added to the containers before or after plants are placed in the container to increase the $CO_2$ levels. Increasing the $CO_2$ levels tends to provide the plants with a variety of atmospheric conditions that can yield faster plant growth or other desirable conditions related to maintaining, selling, and storing plants. In still other embodiments, simple gas addition is employed, for example, through pressurized gas dispensed into the container 11. Other gases may also be added in the container 11 for conditioning plant tissues before the container 11 is sealed.

Accordingly, various modifications, adaptations, and combinations of various features of the described embodiments can be practiced without departing from the scope of the invention as set forth in the claims.

What is claimed is:

1. An apparatus comprising:
a container having an upper portion and a lower portion, wherein the container has an opening at the upper portion of the container;
an amount of growth medium, wherein the amount of growth medium is disposed within an interior of the container along the lower portion;
a plant, wherein at least part of the plant is disposed within the amount of growth medium;
an inner container having at least one opening along a bottom surface of the inner container, wherein the inner container is disposed within the interior of the container, wherein the inner container is shorter in height than the container, wherein the inner container is disposed above the growth medium, and wherein the plant extends from the growth medium, through the at least one opening, and above the bottom surface of the inner container; and
a cover disposed along the top portion of the container, wherein the cover seals the interior of the container, wherein sealing the interior of the container creates a sterile environment, wherein the cover is less than 1 mm in thickness, wherein the cover comprises material that is permeable to air and is not permeable to plant pathogens, and wherein the cover is user puncturable thereby providing plant access.

2. The apparatus of claim 1, wherein the cover is a sealing film.

3. The apparatus of claim 1, wherein the cover attaches to an attachment surface of the container thereby entirely covering the opening of the container.

4. The apparatus of claim 1, wherein the opening of the container is surrounded by a flange that extends outward and away from the interior of the container, wherein the cover is a removable film seal, and wherein the removable film seal is attached to the flange via a heat seal connection.

5. The apparatus of claim 1, wherein the growth medium is selected from the group consisting of: agar with nutritional elements, sterile soil, and a combination of soil and liquid growth medium.

6. The apparatus of claim 1, wherein the cover is removable thereby providing access to the plant disposed in the interior of the container.

7. The apparatus of claim 1, wherein the container includes additional plants also disposed within the growth medium.

8. The apparatus of claim 1, wherein the interior of the container is a sterile growth environment.

9. A method comprising:
depositing an amount of growth medium into a container, wherein the first container has an opening along a top surface;

depositing a plant in the amount of growth medium disposed within the container;

inserting an inner container having at least one opening into the container such that a bottom surface of the inner container is disposed above the growth medium, wherein the plant is extended through the at least one opening of the inner container such that part of the plant is below the bottom surface of the inner container and another part of the plant is above the bottom surface of the inner container, wherein the inner container is shorter in height than the container, and wherein the inserting occurs before the sealing;

sealing the top surface of the container with a cover, wherein sealing the interior of the container creates a sterile environment, wherein the cover is less than 1 mm in thickness, and wherein the cover comprises material that is permeable to air and is not permeable to plant pathogens; and instructing a user to access the plant by puncturing the cover.

10. The method of claim 9, further comprising:
depositing the container into a packaged plant delivery system dispenser.

11. The method of claim 9, further comprising:
instructing the user to deposit the plant into a growth environment outside of the container.

12. The method of claim 9, wherein the growth medium is agar with nutritional components conducive to plant growth.

13. The method of claim 9, wherein the cover is a sealing film, wherein the opening of the container is surrounded by a flange that extends outward and away from the interior of the container, and wherein the sealing involves pressing the sealing film against the flange and applying heat above the sealing film thereby sealing the opening with the sealing film.

14. An apparatus comprising:
a container assembly having an outer container and an inner container, wherein the outer container has an opening along an upper portion and a plant within growth medium disposed in an interior of the outer container along a lower portion, wherein the inner container has at least one opening into the outer container such that a bottom surface of the inner container is disposed above the growth medium, wherein the plant is extended through the at least one opening of the inner container such that part of the plant is below the bottom surface of the inner container and another part of the plant is above the bottom surface of the inner container, wherein the inner container is shorter in height than the outer container, and wherein the inserting occurs before sealing of the container assembly; and means for sealing the opening of the container assembly thereby maintaining sterility of the interior, wherein the means is permeable to air and is not permeable to plant pathogens, and wherein the means is puncturable thereby providing an opening to access the plant.

15. The apparatus of claim 14, wherein the means is a thin film seal.

* * * * *